Patented June 6, 1944

2,350,847

UNITED STATES PATENT OFFICE 2,350,847

PREPARATION OF CARBON BLACK

Max R. Vogel, Easton, Pa., and John W. Snyder, Scotch Plains Township, Union County, N. J., assignors to Binney and Smith Company, New York, N. Y., a corporation of New Jersey No Drawing. Application December 5, 1941, Serial No. 421,845

18 Claims. (Cl. 106—241)

This invention relates to the treatment of carbon black for use as a pigment in the preparation of liquid coating compositions such as enamels, paints, inks and the like. The present application is a continuation-in-part of our application, filed February 24, 1940, which issued as Patent 2,266,104 on December 16, 1941.

An important object of the invention is to provide a specially treated form of carbon black adapted to be introduced, either directly or indirectly, into liquid coating compositions of the oil or resin type containing drying compounds—such as compounds containing the common "drier metals," manganese, cobalt, and lead or naturally occurring drying compounds—an important feature of the invention residing in the fact that the treated carbon black serves in its full capacity as a pigment without seriously retarding the drying rate or the drying stability of such coating compositions.

The invention also aims to provide a method of treating carbon black, and also to provide a coating composition of the oil or resin type including such treated carbon black as an ingredient.

In the preparation of liquid coating compositions of the oil or resin type it is common knowledge that when carbon black is used as the pigmenting agent such compositions require high percentages of drying compounds, and that in many cases, even with this increase in drying compounds, a longer time is required for drying than when most other pigments are employed. This is believed to be largely due to the highly active nature of the carbon black particles and also to the affinity of the carbon black contained in the coating composition for the drier metals. Thus, when carbon black is introduced into the coating composition, portions of the drier metals are attracted by the carbon black particles and are rendered ineffective. Attempts have been made to compensate for this phenomenon by increasing the drier metal content. This has been partly successful as regards accelerating the drying rates of freshly made enamels. However, as such enamels age the drier metals appear to lose their efficacy and eventualy reach a stage where the enamels become unusable. On the other hand, if sufficient drier metals are added initially to produce a satisfactory drying effect after aging for a suitable period, there is then likely to be too much drier present to permit the use of the enamel with good results when freshly made. It is common practice to overload carbon black enamels with drier metals, and when such an enamel is sent out from the factory it is with the expectation that it will remain on the dealers' shelves and age before use. This, however, involves an element of uncertainty and, furthermore, the addition of excess drying metals is objectionable for the reason that this adversely affects the film durability and other physical characteristics of the enamel.

In accordance with the present invention it is proposed to treat the carbon black prior to its introduction into the liquid coating composition so as to make possible black enamels of improved drying characteristics. This treatment involves wetting the carbon black with an aqueous solution of a compound, the character of which will be more particularly described later, and then removing excess moisture from the carbon black.

Carbon black particles are of very small diameter ranging from 60 millimicrons for the coarsest type to less than 25 millimicrons for the finer types. Because of this extreme fineness, a small amount of carbon black, in bulk, presents a very large surface; for example, one pound of a fine grade of carbon black will have a surface area of more than 15 acres. Each unit of surface has highly adsorptive properties which, multiplied by the total area of the surface, render carbon blacks very active. It is a purpose of this invention to inactivate such surface, as far as its effects upon the drying of coating compositions is concerned, this result being accomplished by means of certain inactivating compounds, hereinafter referred to as inactivators. Among such inactivators which have been found to be particularly effective are the water-soluble inorganic salts of hydrochloric acid as will be more particularly pointed out later on.

One example of the process by which the invention was carried out is as follows: Approximately 300 grams of carbon black were wetted by 700 cc. of water in which were dissolved 30 grams of $CuCl_2$. Following this wetting, the resulting mass was dried to a moisture content of two per cent or less leaving approximately 330 grams of treated carbon black.

Thirty-one grams of this treated carbon black were ground 48 hours in a 1-quart ball mill with 2050 gram ½" steel balls together with the following vehicle:

| | Grams |
|---|---|
| Glyptal #2458 (50% alkyd resin in petroleum spirits) | 90 |
| Xylol | 30 |

At the end of the 48 hour grind, 187 gms. of Glyptal 2458 were added and the grinding continued for one hour. An enamel was prepared from the above glyptal-carbon black paste according to the above formula:

| | Grams |
|---|---|
| Glyptal-carbon black paste | 87.5 |
| Resin solution (60% alkyd resin in xylol) | 182.0 |
| Petroleum hydrocarbon derivative | 29.0 |
| Toluene | 29.0 |
| Drier (9.7% metal) | 2.6 |

The petroleum hydrocarbon derivative was of the type sold under the trade name of "Solvesso No. 2." The resin solution is known in the trade as "Rezyl 113–G." The drier, containing 9.7% metal, was prepared as follows:

| | Parts by weight |
|---|---|
| Manganese naphthenate, 6% Mn___grams__ | 100 |
| Cobalt naphthenate, 6% Co_____do____ | 171 |
| Lead naphthenate, 24% Pb_____do____ | 72 |

This enamel, tested at intervals of two weeks over a period of sixteen weeks, showed an average drying time of 5.2 hours; whereas a similarly prepared control enamel using untreated carbon black required 15.5 hours to dry.

As another example of a mode for carrying out our method, 30 gms. of $CoCl_2$ were dissolved in 700 cc. water and used as a treating solution for 300 gms. of carbon black. The excess water was subsequently driven off leaving approximately 330 gms. of treated carbon black. Thirty-one gms. of this treated carbon black were ground in a ball mill with the resin vehicle, and subsequently formulated into an enamel essentially in the same manner as described in the first-mentioned example given above. The average drying time for this enamel over a sixteen week period was 5.1 hours, compared with 15.5 hours for a control enamel prepared from untreated carbon black.

In order to determine the comparative effectiveness of various inactivators, numerous specimen enamels were prepared according to the procedure of the examples given above, using different inactivators for the treatment of the carbon black. In all cases the proportion of inactivator to carbon black was 1 part to 10 parts, respectively, by weight. In addition to such specimen enamels, a control enamel was prepared in a similar manner except that the carbon black used therein was untreated. Because atmospheric conditions exert a marked influence upon drying time, the absolute drying times are not significant standing alone. Therefore, in order to afford a more reliable basis of comparison the drying times of the enamels prepared from the variously treated carbon blacks have been correlated against control enamels each prepared at the same time and under similar conditions as the experimental enamels. All experimental enamels and controls were tested when freshly made and at two-week intervals thereafter for a period of 16 weeks and the average drying times for this period then calculated. All of the treated carbon blacks show drying times substantially shorter than that of the untreated carbon black, and, therefore, indicate improved drying characteristics.

*Carbon black pigmented enamels*

| Inactivator | Average drying time (hours) | |
|---|---|---|
| | Experimental enamel | Control enamel |
| Copper chloride_____ | 5.2 | 15.5 |
| Cobaltous chloride_____ | 5.1 | 15.5 |
| Ferric chloride_____ | 6.4 | 15.5 |
| Ferrous chloride_____ | 7.0 | 15.5 |
| Strontium chloride_____ | 9.6 | 15.5 |
| Aluminum chloride_____ | 11.2 | 15.5 |

The above inactivators are all soluble in water and their manner of application to the carbon black, except for differences in the concentration of the solutions found to give optimum results, is substantially the same.

In order to operate effectively, the proportion of inactivator to the carbon black should be comparatively small. We have found that high proportions of treating material decrease the coloring value of the carbon black being treated. By our process, using limited amounts of inactivators, the coloring value may be enhanced.

While the exact reactions involved by the use of inactivators have not been definitely established, we do know that the surface of carbon black particles is highly active in adsorptive power and chemical reactivity. It is this activity which is responsible for poor drying behavior generally, and it is known that drying retardation varies directly as the degree of activity of a carbon black. Untreated, active carbon black will interfere with the normal drying of an oil or resinous film by adsorbing a large part of both the added metallic compounds and the organic driers naturally present in the vehicle. Such carbon black will also affect the vehicle and driers chemically in such a way as to produce drying retardation. By the present invention this activity is reduced by a process which is partly physical and partly chemical. By simple deposition or chemical decomposition on the carbon black surface, these inactivators reduce or destroy the adsorptive affinity of this surface for drier compounds and so alter the chemical nature of this surface that its deleterious effect on drying is either reduced or completely eliminated. It is, therefore, important that for a compound to be classed as an inactivator it should react favorably, both physically and chemically, with the carbon black. The drying retardation of carbon black is a conjoint action and must be dealt with accordingly, with due regard for both chemical and physical action of the carbon black so far as it affects its adsorptive power.

It seems reasonable to suppose that carbon black has a preferential affinity for the inactivator or its reaction products over the oil soluble drier compounds, added or natural. And that this action is a selective one is indicated by the fact that there is considerable variation between the effectiveness of the various inactivators, and also by the fact that some compounds, and certain compounds of the drier metals that might be expected to give beneficial results, are inoperative. Thus, calcium acid phosphate, and zinc sulphate actually retard the drying of coating compositions containing carbon black as a pigment, while other compounds, such as nickel sulphate, may be classed as indifferent so far as present investigation shows.

While little work has been done to explain what actually occurs when an oxidizing compound like potassium dichromate is adsorbed on carbon black, there is evidence to believe that the salt undergoes some decomposition. This decomposition probably deposits an insoluble residue on the carbon black surface which reduces its activity. The use of inactivator compounds is not to be considered mere drier preloading, for the reason that the inactivator need not be soluble in the oil or resin vehicle which is an essential condition for driers. In any event it appears logical to assume, judged upon the basis of present investigations, that compounds which bring about improved drying characteristics in carbon black pigmented coating compositions, first, must be of the type for which carbon black has a pronounced affinity, and second, must either decompose or be fixed upon the surface of the carbon black in such manner as to prevent their dislodgment when the carbon black is ground into the liquid vehicle.

While the particular coating composition selected as an example in the foregoing description is an enamel, it is to be expected, and experiment has confirmed the fact, that the inactivators are equally efficaceous for other classes of liquid coating compositions, such as paints, inks, etc., in which oil or a resin, or a combination of both, forms the vehicle for the carbon black pigment and drier metals.

Coating compositions produced from treated carbon black as described above in many cases are superior in physical characteristics—gloss, depth of color, stability and durability—to coating compositions in which untreated carbon black is used as the pigmenting agent.

We are aware of the patents of William B. Wiegand, Nos. 2,178,382 and 2,178,383, both granted October 31, 1939, relating to the treatment of carbon black and lamp black with a compound designed to modify the pH of these blacks and thereby increase their dispersion properties.

The present invention is not to be restricted to any specific proportions or manner of procedure beyond the limitation of the appended claims.

We claim:

1. The method of treating carbon black for use as a pigment in coating compositions included within the class consisting of drying oils and resins and containing a drier compound, which comprises applying to the carbon black an aqueous solution of an inactivating compound for rendering the carbon black less reactive with respect to the drier compound, said inactivating compound comprising a water-soluble inorganic salt of hydrochloric acid, and then removing excess moisture from the carbon black by drying.

2. The method of treating carbon black for use as a pigment in coating compositions included within the class of drying oils and resins and containing a drier compound, which comprises applying to the carbon black an aqueous solution of an inactivating compound for rendering the carbon black less reactive with respect to the drier compound, said inactivating compound comprising a water-soluble inorganic salt of hydrochloric acid and in proportion not substantially exceeding 10 per cent by weight of the carbon black, and then removing excess moisture from the carbon black by drying.

3. The method of treating carbon black for use as a pigment in coating compositions included within the class consisting of drying oils and resins and containing a drier compound, which comprises applying to the carbon black an aqueous solution of an inactivating compound for rendering the carbon black less reactive with respect to the dried compound, said inactivating compound being selected from the group of water-soluble chlorides of the class consisting of copper chloride, cobaltous chloride, ferric chloride, ferrous chloride, strontium chloride, and aluminum chloride, and then removing excess moisture from the carbon black by drying.

4. The method of treating carbon black for use as a pigment in coating compositions included within the class consisting of drying oils and resins and containing a drier compound, which method comprises applying to the carbon black an aqueous solution of copper chloride, and then removing excess moisture from the carbon black by drying.

5. The method of treating carbon black for use as a pigment in coating compositions included within the class consisting of drying oils and resins and containing a drier compound, which method comprises applying to the carbon black an aqueous solution of cobaltous chloride, and then removing excess moisture from the carbon black by drying.

6. The method of treating carbon black for use as a pigment in coating compositions included within the class consisting of drying oils and resins and containing a drier compound, which method comprises applying to the carbon black an aqueous solution of ferric chloride, and then removing excess moisture from the carbon black by drying.

7. A carbon black pigment for coating compositions included within the class consisting of drying oils and resins and containing a drier compound, said carbon black having a surface film of a water-soluble inactivating compound for rendering the carbon black less reactive with respect to the drier compound, said inactivating compound comprising a water-soluble inorganic salt of hydrochloric acid.

8. A carbon black pigment for coating compositions included within the class consisting of drying oils and resins and containing a drier compound, said carbon black having a surface film of a water-soluble inactivating compound for rendering the carbon black less reactive with respect to the drier compound, said inactivating compound comprising a water-soluble inorganic salt of hydrochloric acid in proportion not substantially exceeding 10 per cent by weight of the carbon black.

9. A carbon black pigment for coating compositions included within the class consisting of drying oils and resins and containing a drier compound, said carbon black having a surface film of a water-soluble inactivating compound for rendering the carbon black less reactive with respect to the drier compound, said inactivating compound being selected from the group of water-soluble chlorides of the class consisting of copper chloride, cobaltous chloride, ferric chloride, ferrous chloride, strontium chloride and aluminum chloride.

10. A carbon black pigment for coating compositions included within the class consisting of drying oils and resins and containing a drier compound, said carbon black having a surface film of copper chloride.

11. A carbon black pigment for coating compositions included within the class consisting of drying oils and resins and containing a drier compound, said carbon black having a surface film of cobaltous chloride.

12. A carbon black pigment for coating compositions included within the class consisting of drying oils and resins and containing a drier compound, said carbon black having a surface film of ferric chloride.

13. A liquid coating composition of the oxidizing-polymerizing organic vehicle type containing carbon black as a pigmenting agent and a drier compound, the carbon black having a surface film of a water-soluble inactivating compound for rendering the carbon black less reactive with respect to said drier compound, said inactivating compound comprising a water-soluble inorganic salt of hydrochloric acid.

14. A liquid coating composition of the oxidizing-polymerizing organic vehicle type containing carbon black as a pigmenting agent and a drier compound, the carbon black having a surface film of a water-soluble inactivating compound for rendering the carbon black less reactive with respect to said drier compound, said inactivating compound comprising a water-soluble inorganic salt of hydrochloric acid in proportion not substantially exceeding 10 per cent by weight of the carbon black.

15. A liquid coating composition of the oxidizing-polymerizing organic vehicle type containing carbon black as a pigmenting agent and a drier compound, the carbon black having a surface film of a water-soluble inactivating compound for rendering the carbon black less reactive with respect to said drier compound, said inactivating compound being selected from the group of water-soluble chlorides of the class consisting of copper chloride, cobaltous chloride, ferric chloride, ferrous chloride, strontium chloride and aluminum chloride.

16. A liquid coating composition of the oxidizing-polymerizing organic vehicle type containing carbon black as a pigmenting agent and a drier compound, the carbon black having a surface film of copper chloride.

17. A liquid coating composition of the oxidizing-polymerizing organic vehicle type containing carbon black as a pigmenting agent and a drier compound, the carbon black having a surface film of cobaltous chloride.

18. A liquid coating composition of the oxidizing-polymerizing organic vehicle type containing carbon black as a pigmenting agent and a drier compound, the carbon black having a surface film of ferric chloride.

MAX R. VOGEL.
JOHN W. SNYDER.